Sept. 13, 1932.  E. J. MORAN  1,877,527

PROCESS FOR THE MANUFACTURE OF GASSED OR SPONGE RUBBER

Filed June 27, 1931

Witness:
Chas. P. Komahs

Inventor,
Edward J. Moran,
Benj. J. Roadhouse Atty.

Patented Sept. 13, 1932

1,877,527

UNITED STATES PATENT OFFICE

EDWARD J. MORAN, OF LA PORTE, INDIANA, ASSIGNOR TO VELVETEX CORPORATION, OF LA PORTE, INDIANA, A CORPORATION OF ILLINOIS

PROCESS FOR THE MANUFACTURE OF GASSED OR SPONGE RUBBER

Application filed June 27, 1931. Serial No. 547,441.

My present invention relates to an improved process for the manufacture of gassed or sponge rubber. Gassed or sponge rubber is rubber, the mass of which contains a great number of more or less minute voids.

Sponge rubber is produced in a number of ways, the most common of which is to mix with a vulcanizable rubber compound an element or elements which will gasify during the curing of the rubber. Such elements may be a carbonate or bicarbonate of an alkaline earth and an acid, or water alone will gasify when subjected to the temperatures ordinarily employed in curing vulcanizable rubber compounds.

When gassed or sponge rubber is cured it is rolled into sheets, or pressed into other forms, and, so far as I am aware, placed between plates or in molds which have been previously covered with a fabric so as to permit of the dispersal of the portion of the gas which comes to the surface during the curing process. The result of such treatment is the formation of a skin upon the surface of the sponge rubber which is relatively free of voids and is relatively more dense and tougher than the interior of the sponge rubber where the films of rubber separating the voids are relatively thin.

Where the spongy texture is desired upon the surface this skin has to be removed, but there are many situations in which the yielding character of the sponge rubber mass is the desired feature, instead of a spongy surface texture, in which cases a more lasting product may be secured by increasing the depth of the skin, and my present invention has for its object the provision of sponge rubber articles, sheets or other forms, having a relatively greater depth and strength of surface skin.

Figure 3:
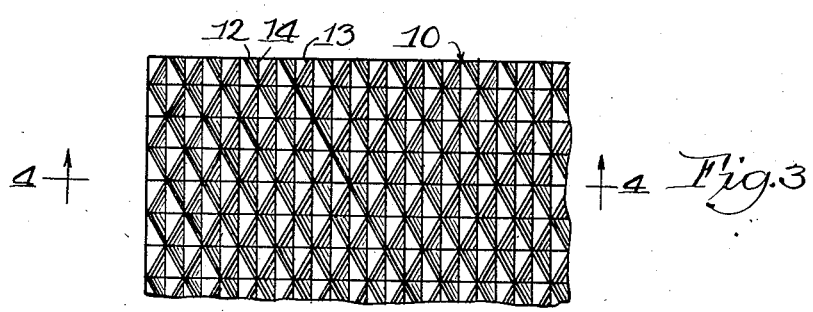
Figure 4:
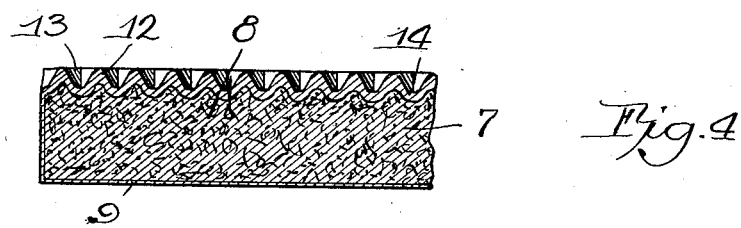
Figure 5:
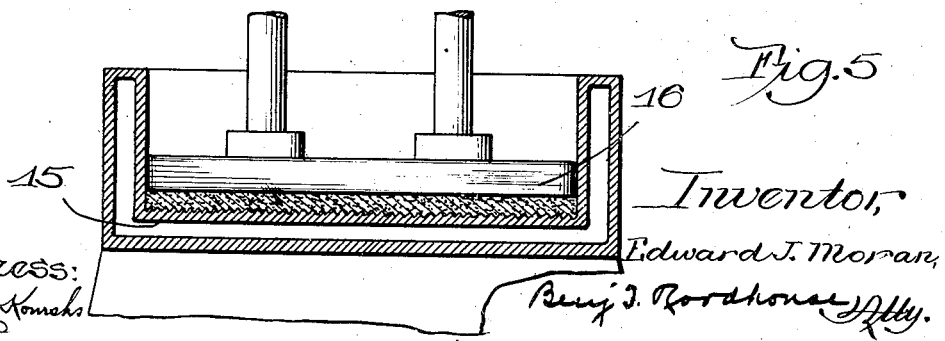

I attain the foregoing objects in the manner hereinafter illustrated and described. In the drawing I have illustrated schematically in Fig. 1 one form of surfacing of sponge rubber articles, and in Fig. 2 a section on line 2—2 of Fig. 1. Fig. 3 is a modified form of surfacing. Fig. 4 is a section on line 4—4 of Fig. 3. Fig. 5 is a section through a mold or press employed for curing the sponge rubber Similar reference characters have been employed for designating similar parts throughout the respective views.

I am aware that solid, as distinguished from gassed or sponge rubber, has heretofore been vulcanized or cured in direct contact with metal, either in the form of plates or molds, but, so far as I am aware, as has heretofore been noted, when vulcanizing or curing sponge rubber the plates or molds have uniformly been covered with a woven textile so as to permit of the dispersal of that portion of the gas generated during the curing process which comes to the surface.

I have found that by curing sponge rubber directly in contact with metal plates or molds that gas does not accumulate between the rubber and the plate, but on account of the relatively greater temperature of the plate, or for some other reason, the gas is driven back into the body of the rubber, so that a denser and tougher skin may be produced during the vulcanization of sponge rubber by employing uncovered plates or molds in the vulcanizing or curing thereof.

Figure 1:
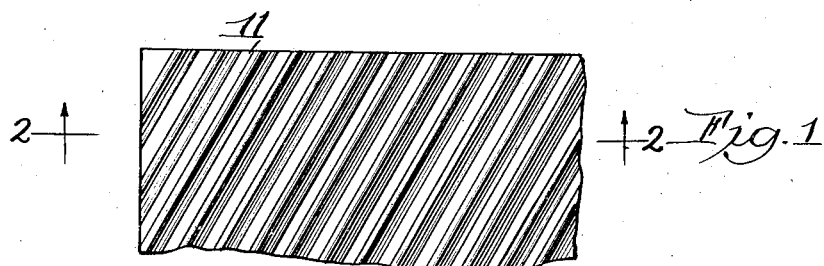
Figure 2:
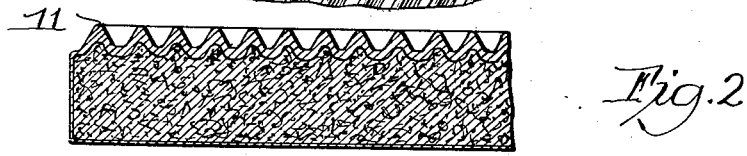

I have further discovered that the surface skin of sponge rubber may be further increased and toughened by providing in the face of the metal plates or molds minute corrugations arranged in parallel relation, as shown in Figs. 1 and 2, or arranged obliquely with respect to each other so as to provide intersecting ridges and depressed diamond shaped recesses, as shown in Figs. 3 and 4.

In the drawing I have illustrated the result of the application of my process to but one surface of the product as it is usually unnecessary to specially thicken or toughen both surfaces.

In Figs. 1 and 2 I have illustrated the result of providing the face of the plate with V-shaped parallel corrugations. In these figures the reference character 7 designates the body of the sponge rubber material containing innumerable small voids 8. The back 9 may be vulcanized in contact with any desired surface, that is to say, in contact with a fabric as is the usual practice, or in contact with metal plates, as herein described. The surface 10, however, has been molded in contact with a plate in which have been provided relatively small parallel V-shaped grooves which produce upon the face of the product small V-shaped parallel ridges 11.

A very fine and tough surface may be secured by channeling the plate with minute cured by channeling the plate with minute first mentioned, whereby there is provided upon the surface of the product obliquely intersecting ridges 12 and 13 with diamond shaped depressed areas 14. In Fig. 5 is conventonally shown a vulcanzing press between plates 15 and 16 of which the sponge rubber stock is interposed.

Means are provided for compressing these plates upon the stock and for heating the plates, the particular character of which means is not a portion of the present invention.

Having described my invention what I claim as new and desire to secure by Letters Patent is:

1. The process for increasing the surface skin upon gassed or sponge rubber articles by curing sponge rubber stock in direct contact with a heated metal plate having parallel grooves in the surface thereof.

2. The process for increasing the surface skin upon gassed or sponge rubber articles by curing sponge rubber stock in direct contact with a heated metal plate having a plurality of series of parallel grooves arranged in intersecting relation.

EDWARD J. MORAN.